US008724781B2

(12) United States Patent
Sunder et al.

(10) Patent No.: US 8,724,781 B2
(45) Date of Patent: May 13, 2014

(54) SYSTEM AND METHOD FOR OFF-NET PLANNED COST DERIVATION, ANALYSIS, AND DATA CONSOLIDATION

(71) Applicant: Level 3 Communications, LLC, Broomfield, CO (US)

(72) Inventors: Cecil Sunder, Broomfield, CO (US); Shannon Griffith, Thornton, CO (US); Lalu Vazhekatt, Northglenn, CO (US); Deborah Kay Sydney, Georgetown, TX (US); Sara Ann Nicholson, Round Rock, TX (US); Timothy Jason Bruny, Broomfield, CO (US); Sharon B. Pool, Pflugerville, TX (US); Sean David Herrick, Leroy, NY (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 14/015,608

(22) Filed: Aug. 30, 2013

(65) Prior Publication Data

US 2014/0064468 A1    Mar. 6, 2014

Related U.S. Application Data

(60) Provisional application No. 61/695,826, filed on Aug. 31, 2012, provisional application No. 61/709,658, filed on Oct. 4, 2012.

(51) Int. Cl.
*H04M 15/00* (2006.01)

(52) U.S. Cl.
USPC ............. 379/114.04; 379/114.05; 705/20; 705/34

(58) Field of Classification Search
USPC ............. 379/100.03, 100.04, 111, 112.05, 379/112.07, 114.01, 114.05, 114.12, 379/114.29, 115.01, 121.01, 121.02, 379/121.04, 125, 126, 127.01, 127.03, 379/127.05, 114.04; 705/20, 34
See application file for complete search history.

(56) References Cited

U.S. PATENT DOCUMENTS

| | | | | |
|---|---|---|---|---|
| 2002/0198629 | A1* | 12/2002 | Ellis | 700/286 |
| 2003/0009401 | A1* | 1/2003 | Ellis | 705/35 |
| 2008/0165789 | A1* | 7/2008 | Ansari et al. | 370/401 |
| 2009/0307117 | A1* | 12/2009 | Greiner et al. | 705/34 |
| 2011/0086610 | A1* | 4/2011 | Baldwin et al. | 455/405 |
| 2013/0282541 | A1* | 10/2013 | Greiner et al. | 705/34 |

* cited by examiner

*Primary Examiner* — Binh Tieu

(57) ABSTRACT

Implementations of the present disclosure involve a system and/or method for correlating the cost of ordered telecommunications services. The system receives a customer order that includes various services. The services are matched to available solutions for the services. Each solution includes one or more product instances that are used to implement the solution. Each product instance may be matched to a service component. Each service component may be associated with an on-net service or an off-net service. Service components associated with on-net services may be assigned a cost. Service components associated with off-net services may be correlated to an off-net service and an estimated cost.

21 Claims, 5 Drawing Sheets

SYSTEM AND METHOD FOR OFF-NET PLANNED COST DERIVATION, ANALYSIS, AND DATA CONSOLIDATION

RELATED APPLICATIONS

This application claims priority under 35 U.S.C. §119(e) to provisional patent application No. 61/695,826 titled "OFF-NET PLANNED COST DERIVATION, ANALYSIS, AND DATA CONSOLIDATION," filed on Aug. 31, 2012, and provisional patent application No. 61/709,658 titled "OFF-NET PLANNED COST DERIVATION, ANALYSIS, AND DATA CONSOLIDATION," filed on Oct. 4, 2012, which are both hereby incorporated by reference herein.

FIELD OF THE DISCLOSURE

Aspects of the present disclosure involve deriving a cost estimate related to providing services that include on-net and off-net telecommunications services. A customer's order for services is correlated to one or more service components each with an expected cost. The estimated cost may be updated as the services are provisioned and any potential billing discrepancies may be identified before actual billing occurs.

BACKGROUND

In the telecommunications industry, sales agents are tasked with quickly providing accurate cost estimates for services offered by other telecommunications provider. As technology has evolved, telecommunications services have grown from basic telephone services, to advanced telephone services (including digital telephone services, caller ID, call waiting, voicemail, etc.), Internet connectivity, high-speed Internet connectivity, dedicated network connections between a company's various locations, voice over IP (VoIP) services, video streaming and video conferencing services, among others. To provide the services, such providers must maintain and deploy a vast amount of infrastructure. Such infrastructure includes switches, routers, repeaters, servers, firewalls, and physical connections between components that make up a network. For example, to provide Internet service to an office in a building, the office may need to be connected to a building router that is in turn connected to a network cable running under a street that's in front of the building. The cable running under the street may in turn be connected to the greater Internet at a switch located near the city center.

Accurately estimating the cost for providing services is often challenging because in many instances, a given telecommunications provider must use other provider's infrastructures. Using the above office example, the telecommunications provider may own the infrastructure that connects to the greater Internet, but may not own the infrastructure in the building or the cable running under the street. The costs associated with using other telecommunications providers' infrastructure are referred to as off-network or "off-net" costs, while the costs associated with using the provider's infrastructure are referred to as on-network or "on-net" costs. Connecting the office to the Internet therefore may include off-network costs for using the building's infrastructure and the local infrastructure running under the street, in addition to the on-net costs associated with connecting to the provider's infrastructure.

In order to accurately estimate the cost of services, a sales agent must account for both the off-net costs and the on-net costs. A telecommunication company therefore acts as both a provider of services and an intermediary between the customers and the off-net providers.

Accurately estimating the costs associated with off-net services is important, because incorrect estimates can lead to costly billing disputes with customers. In practice, the sheer volume of invoices often makes it difficult to recognize billing discrepancies. The inevitable discrepancies often lead to lengthy billing disputes that result in the non-payment of balances or partial payments. Thus, it is advantageous to recognize any discrepancies between the customer's bill and the estimated cost as early as possible, so that the dispute process can be taken care of quickly. Therefore, there is a need to define logic for end-to-end correlation of a quoted cost and accurately identify planned off-net access costs to estimate the cost of services sold to provide a more accurate estimate and audit processes to improve gross margins, optimize billing dispute resolution for all parties, and maximize capacity utilization. At present, no industry standard tools exist to derive off-net planned cost before billing occurs.

It is with these issues and problems in mind that various aspects of the present disclosure were developed.

SUMMARY

According to one aspect, a system and method for correlating costs of telecommunications services is provided. The system receives one or more services from a customer order and matches the services to available solutions for providing the services. Each solution is made up of product instances that are used to provide each solution. Product instances may correspond to service components that designate whether the service is an on-net or on-net service. The cost of each off-net service component may be correlated according to an external carrier circuit identifier associated with the off-net component. The expected cost of the off-net services may be summed to estimate an off-net planned cost.

BRIEF DESCRIPTION OF THE DRAWINGS

Example embodiments are illustrated in referenced figures of the drawings. It is intended that the embodiments and figures disclosed herein are to be considered illustrative rather than limiting.

DETAILED DESCRIPTION

Aspects of the present disclosure involve a system and method for estimating costs associated with providing a network service or set of network services that include on-net services, off-net services, or both. The services ordered may be analyzed and correlated to past service costs and provide an estimate of the on-net and off-net costs. The estimate may be revised throughout the process of fulfilling the order. Any relevant data relating to the installation of a telecommunication system may be consolidated and analyzed to revise cost estimates. The cost correlation system identifies services that will result in an off-net cost by matching orders to solutions made up of one or more product instances. Each product instance may be matched to an on-net or off-net cost. The cost correlation system estimates the cost of the off-net service, and consolidates the off-net costs with on-net costs to provide a complete estimate for providing the desired services. The system may update the cost estimate as a workflow for constructing the system is established and as hardware needed to provide the service is provisioned and installed.

Figure 1:
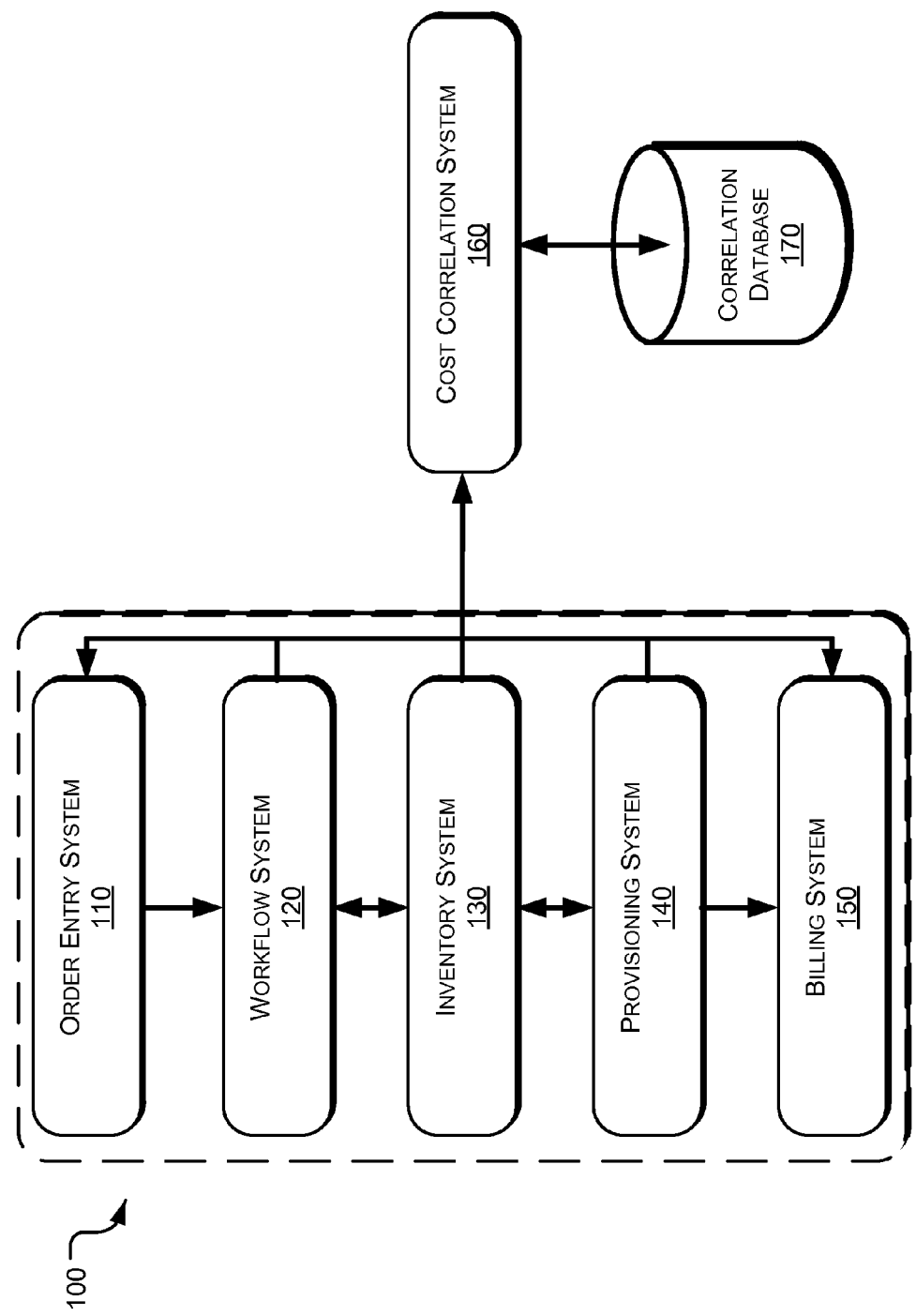
FIG. 1 depicts a block diagram of an order process from order entry to billing.

The process of providing telecommunications services may be broken into a series of steps, starting at the creation and entry of an order and concluding with the delivery of the ordered services and billing. A cost correlation system may be configured to interface with one or more existing systems used for placing and fulfilling orders. For example, referring to FIG. 1, an example order and fulfillment system 100 and cost correlation system 160 are depicted. The order and fulfillment system 100 divides the process of ordering and providing services into order entry, workflow design, inventory, provisioning, and billing. Each of these steps in the order process may be implemented using an individual system. For example, the depicted order and fulfillment system 100 includes an order entry system 110, a workflow system 120, an inventory system 130, a provisioning system 140, and a billing system 150. The cost correlation system 160 may be configured to receive information regarding an order from each of the individual systems as the order progresses from order entry to actual implementation. At each stage in the order process, the cost correlation system 160 may receive information about the order and correlate the information to on-net costs and past costs associated with the use of the off-net services. The cost correlation system 160 then provides feedback to the order and fulfillment system 100 to improve the quote provided to the customer, and identify whether providing the services will deviate from the quoted cost, allowing the system to identify a potential billing discrepancy before the customer receives a bill.

The order system 110 provides a customer with quotes for services and accepts customer orders. Customer requirements may be provided to the order entry system 110 and the order entry system matches the customer requirements to services offered by the telecommunications provider. For example, the order system 110 may include a commercially available order entry and quoting system such as SIEBEL, Pipeline, or any other order system. The order system 110 may be configured to facilitate the ordering of products and/or services. For example, the order system 110 may be configured to show services that are available in geographic locations, allow for quotes for products/services to be generated, and allow for a customer order to be inputted and an invoice generated. For example, a customer may wish to have a dedicated network connection between two of the companies locations. The order system 110 may also have access to information about network infrastructure that is necessary for generating quotes. Thus, in order to provide a quote for the dedicated network connection, the order system 110 may retrieve information related to the network infrastructure that could be used to interconnect company locations.

Quotes for services may be generated after receiving a request for products and/or services offered by the telecommunications provider. For example, a customer may wish to add video conferencing services between two of the customer's locations. The order system receives the locations of that the customer wishes to connect and generates a quote. Video conferencing services may, for example, require one-time costs of connecting each location to a network and installing hardware at each location, as well as monthly reoccurring service costs. The cost correlation system 160 receives a service or services and correlates the services to on-net services and off-net services. The correlation is used to estimate the price of each off-net service by using past order data stored in the correlation database 170. The cost correlation system 160 then provides the expected cost determined by the correlation of the services ordered to on-net and off-net costs to the order system 110. The order system 110 may then use the estimated off-net costs along with on-net costs to generate a quote.

Once an order has been received, the workflow system 120 generates an order workflow describing the steps defining how the order will be fulfilled. The order workflow includes each aspect of how the ordered services will be provided to the customer. Returning to the example of interconnecting to geographically remote facilities, when connecting a new office building without any existing network infrastructure to existing infrastructure involves a workflow that includes the physical installation of any necessary cabling, switches, or other infrastructure and each aspect of the installation. For example, the workflow may include laying fiber optic cables and adding a switch that connects to the fiber optic cable at the new building. The workflow may also include a plan for the allocation of existing network infrastructure. For example, once the new network infrastructure has been connected to existing network infrastructure, the workflow may call for an allocation of bandwidth on the existing network infrastructure. The generated workflow may be sent to the cost correlation system 160 which utilizes the correlation database 170 to project the cost of any off-net services that will be utilized by the services indicated in the order workflow. The workflow information allows for the accuracy of the estimate of the off-net costs to be improved by including updated information on how the implementation of the ordered services will be performed.

After the order workflow has been generated, the inventory system 130 may be used to determine whether there is sufficient inventory for fulfilling the order. The inventory system 130 may be configured to keep records of the various network elements forming the network infrastructure of the telecommunications provider, as well as the information about the operational status of the network element. For example, the inventory system 130 may keep a record of where each network element is located, whether the network element is operational, the operating capacity of the network element, the level of operating capacity at which the network element is operating, and any other information about each network element. The inventory system also may keep records regarding network elements that are not currently in use or deployed. For example, the inventory system 130 may also include network elements, such as unused cables, routers, switches, firewalls, audio/video equipment, or any other network elements. The inventory system 130 may receive an inquiry from the workflow system 120 regarding the availability of various network elements. In some cases, the inventory stipulated by the order workflow may not be available. For example, continuing with the example above, there may be no additional network capacity on the existing network infrastructure. Thus, a new workflow would need to be developed by the workflow system 120 to accommodate not using the currently specified existing network infrastructure. The updated workflow may then be sent to the cost correlation system 160, the off-net costs may be re-estimated, and the total cost may be updated.

Once the inventory system 130 determines the appropriate inventory is available, the provisioning system 140 is tasked with the implementation of the order workflow. Again, using the above example, this may include scheduling the installation of the new infrastructure and the allocation of existing network infrastructure. Similar to the inventory system 130, the provisioning system 140 may determine that a given workflow is not viable. For example, the provisioning system 140 may determine that provisioning the bandwidth is impossible. Again, the order workflow may be modified to provide the ordered services without using the previously selected network infrastructure and the modified workflow may be sent to the cost correlation system 160 so that the estimated cost may be updated.

Once all of the services have been provisioned and are active, the billing system 150 bills the customer for the actual cost of the services. Before sending the customer a bill for the services, the billing system 150 may compare the final bill with the quoted and/or updated estimate(s). If the difference between an off-net cost on the final bill and the estimated off-net cost exceeds a threshold, the billing system 150 may be configured to automatically generate a billing dispute with the off-net service provider.

Figure 2:
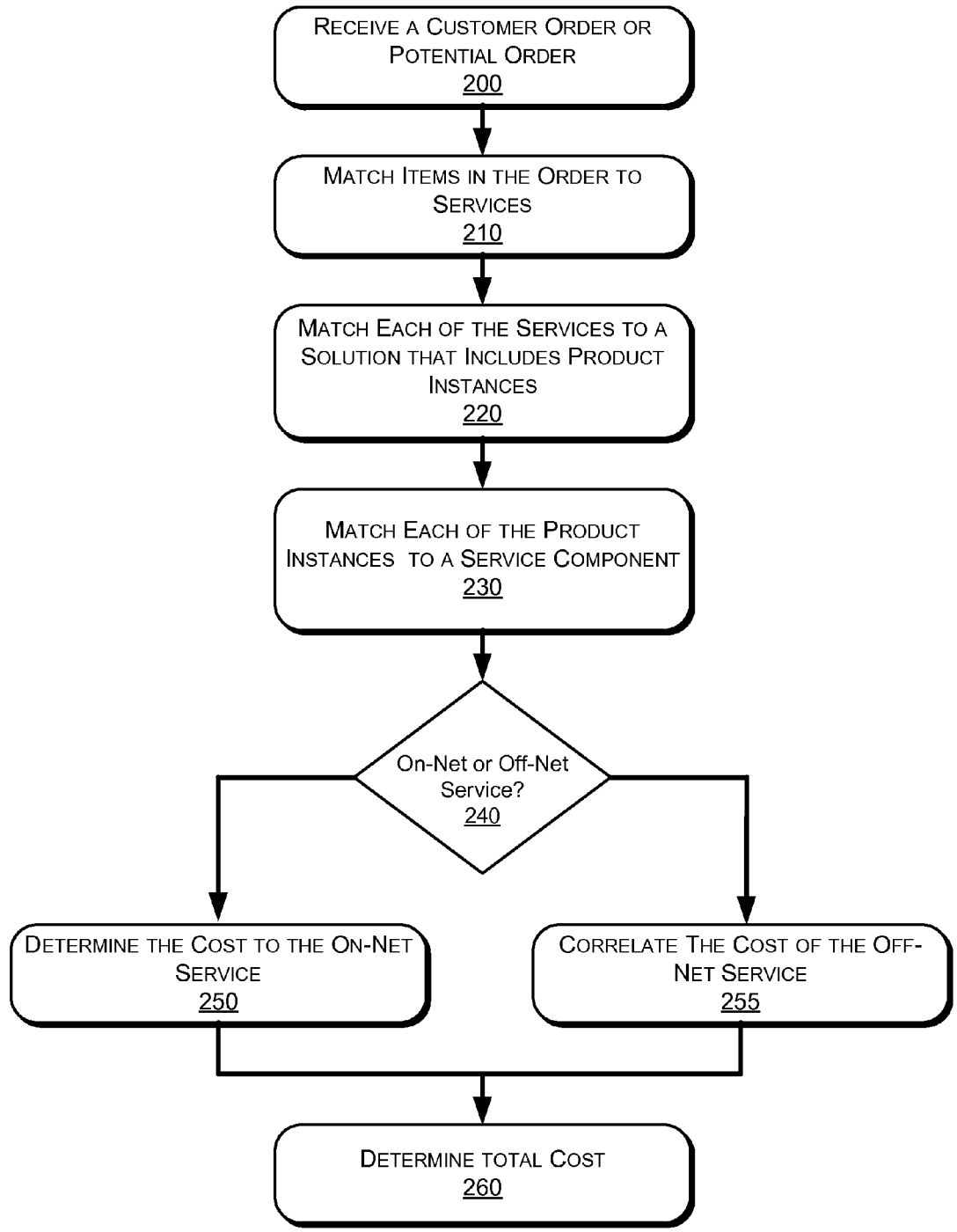
FIG. 2 depicts a method of performing off-net cost correlation of an ordered service.

Referring now to FIG. 2, a method of estimating service costs including on-net and off-net services is depicted. A customer order or a requested service quote may be provided to the cost correlation system 160 by the order entry system 110 (operation 200). The customer order or quote request may include a list of one or more services and may be automatically sent to the cost correlation system 160 when a customer requests a quote, when the order is placed, or may be manually entered by a user. After receiving the customer order or quote request, the cost correlation system 160 may match each item in the order to one or more services offered by the telecommunications company (operation 210). For example, a customer order may include Internet connectivity, video streaming services, and voice services. Each of the services may be analyzed individually and a total cost including any projected off-net costs, may then be determined.

Each service may then be matched to a solution that provides the indicated service. (operation 220). Each solution may include a service that includes one or more product instances that, when combined, are capable of providing the desired service. For example, the ordered Internet connectivity and video streaming service may both include network related product instances such an allocation of bandwidth from an existing network between the two locations, new additions to the existing network infrastructure to connect one or both of the locations, and network hardware such as firewalls, switches, or any other networking hardware.

The cost correlation system 160 matches each product instance to a service component that indicates whether the product instance involves an on-net service or an off-net service (operation 230). The cost correlation system 160 then divides the costs into on-net and off-net costs (operation 240). The prices of on-net costs are determined by the identifying the current rate that the telecommunications provider is charging for the service component (operation 250). Off-net costs are estimated by correlating the service components with previously billed amounts for the service component (operation 255). Each off-net service component may be associated an external carrier circuit identifier (ECCKT) identifying the off-net service. An ECCKT is used by off-net vendors as billing identification codes for the services that they offer. The ECCKT may include information that is necessary to order and implement the off-net service component, including the off-net vender name, the cost of the service component, and any other information necessary for the implementation of the off-net service component. The cost of each service component may be aggregated into a planned cost, reported to the order entry system 110, and stored in a database for future comparison (operation 260). The customer may or may not decide to order the quoted services, and the quote process may be repeated several times until a customer decides on the exact services that the customer wishes to purchase.

Figure 3:
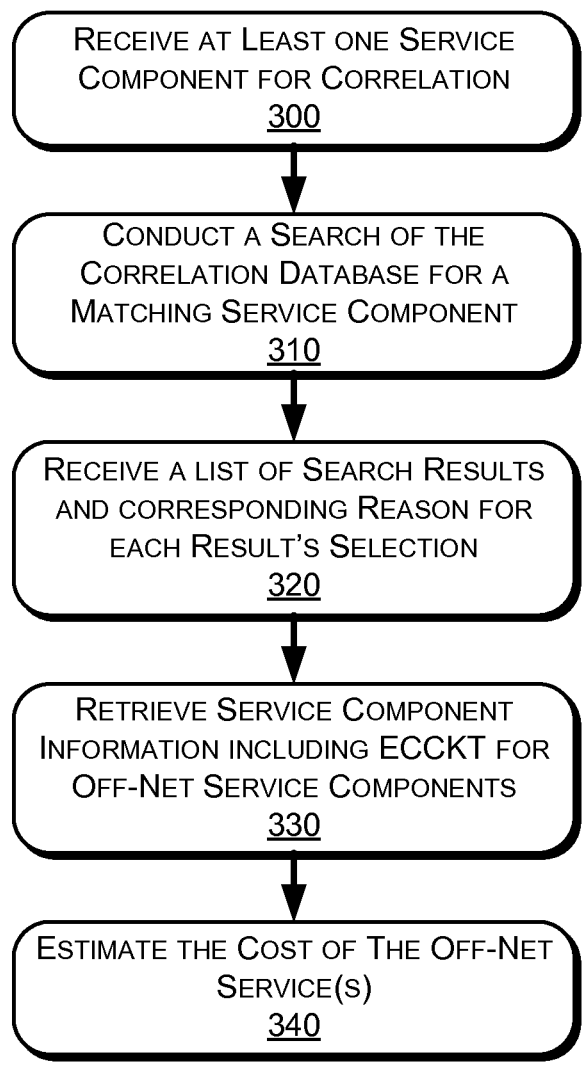
FIG. 3 depicts a correlation method for a list of services.

Referring to FIG. 3, a method of correlating an off-net service to a cost is depicted. As described above with reference to FIG. 2, estimating the cost of an order may be accomplished by matching orders to services, breaking down the services into one or more product instances, and matching the product instances to service components that have an associated cost. The various service component costs may then be tabulated to form a cost estimate for the order.

Each service component offered by the telecommunications company may be included in the correlation database 170. The correlation database 170 may be according to any database standard. The correlation database 170 includes an element for each service component. Each element may include various fields that describe the functions of the service component, the location, the performance, or any other data describing the features and functionality of the service component. For example, each element may include an identifier of the service component, such as an ECCKT for off-net service components, a cost associated with the service component, historical costs associated with the service component, a description of the service component, key words associated with the service component, and any other relevant information. The correlation database 170 may operate on either the same computing system as the cost correlation system 160 or on a computing system in communication with the cost correlation system 160.

The cost correlation system 160 may receive a service component or a list of service components that are for on-net or off-net services (operation 300). Each provided service component then may be correlated to an on-net or off-net service component by searching the correlation database 170. The search may include a keyword search of the service component descriptions (operation 310). The information contained in the various service component fields may be used as search criteria. For example, a service component may have a connection speed field designating a minimum bandwidth of 1 Gb. A corresponding search of the correlation database 170 may include searching for off-net service components with a connection speed field with a value of at least 1 Gb.

In addition to using the fields describing the service component, the cost correlation system 160 may also identify keywords from a service component's description to conduct a keyword search of the correlation database 170. For example, the service component may include a general description filed listing a "point-to-point high definition video from location A to location B." In this example, the cost correlation system 160 may identify the keywords to include "point-to-point," "high definition video," "video," and "location A to location B." The cost correlation system 160 may initially search the correlation database 170 for on-net services that correspond to the service component, and, if no on-net service corresponding to the service component is identified, then search for matching off-net service components.

Each search of the correlation database 170 may return a list of identified off-net service component matches along with a corresponding explanation of why each off-net service was matched (operation 320). For example, the explanation may include a list of keywords that were found in a matched off-net service component. Each of the off-net service components that are matched may also be scored according to how well they correspond with the service component being searched for. The best match may then be selected and if the service component is for an off-net service component, the corresponding ECCKT is determined (operation 330). A cost estimate for the off-net service component may then be determined using pricing information associated with the ECCKT including historical cost data, such as historical estimates and actual billed costs.

As described above, once an order has been entered, the order and fulfillment system 100 works towards the fulfillment of the order by creating a workflow outlining the steps to implement the order, assessing the current available inventory, and provisioning services for the implementation of the order. The solution used for the order may be modified based on various conditions, such as inventory issues and implementation issues. The order itself is not modified due to the conditions, but the solution used to fulfill the order may be modified to provide the same service using available network infrastructure.

For example, the workflow system 120 may be configured to determine the sequence of steps required to implement the order. For example, an ordered service may require adding network infrastructure, such as direct fiber optic line between two locations. Adding the fiber optic line may include adding a fiber optic cable between the locations and connecting the locations to the fiber optic cable using networking equipment. The workflow system 120 determines and schedules the construction of the connection. Changes may be made to the workflow so that the ordered services may be properly implemented. For example, the original order may have made incorrect assumptions about network capacity or the ability to add new network infrastructure. Thus, the estimated cost of an order may be adjusted as deviations from the original quote are made. The workflow constructed by the workflow system 120 may therefore be provided to (or retrieved by) the cost correlation system 160 and expected cost may be re-correlated to reflect the updated solution to the order.

Figure 4:
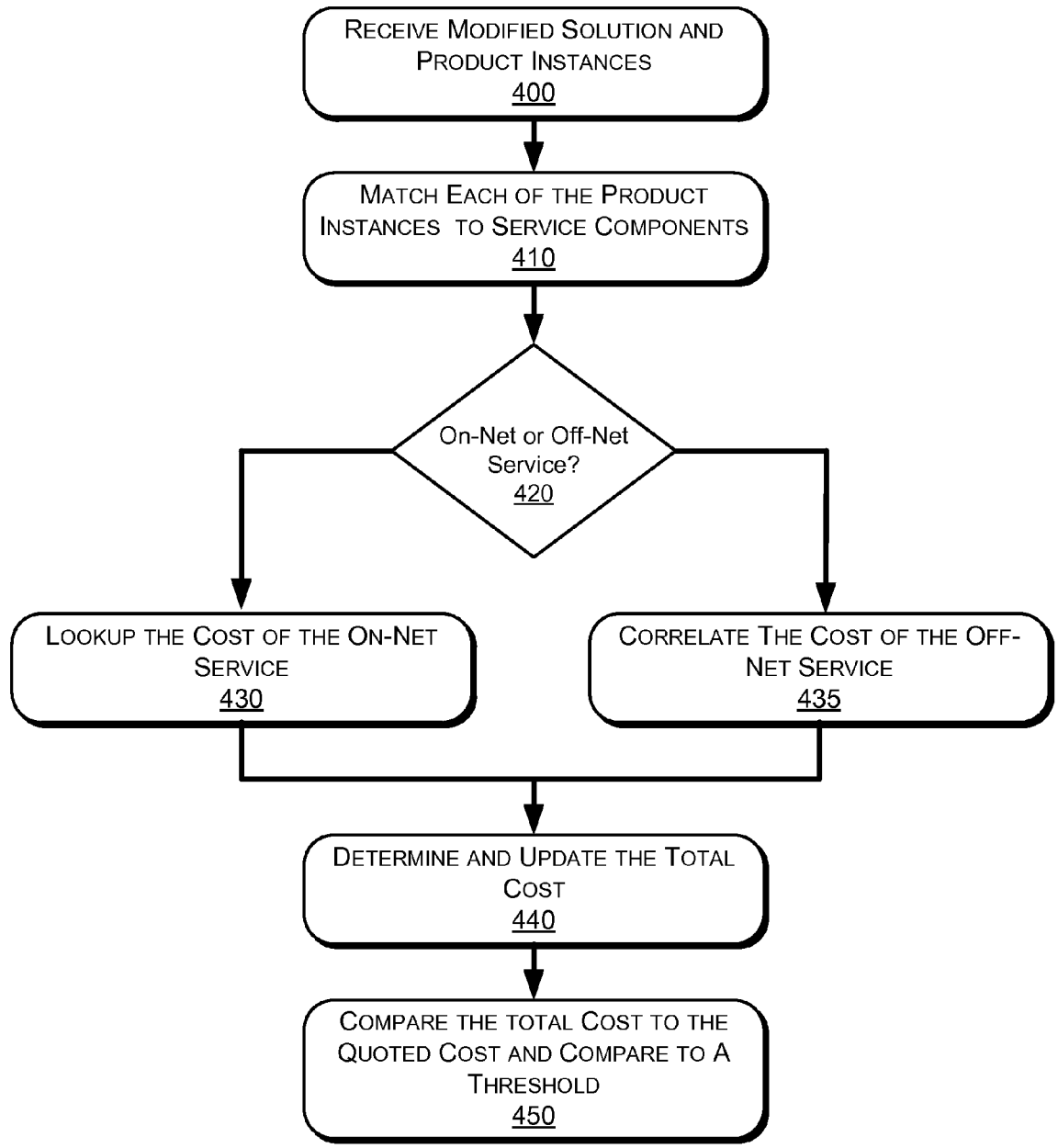
FIG. 4 depicts a method for updating a cost estimate during the implementation of an order.

Referring to FIG. 4, a method of modifying an estimated service cost is depicted. Instead of an order being received by the cost correlation system 160, as in the case of FIG. 2, a modified solution may be provided to the cost correlation system 160 (operation 400). The modified solution is directed towards the same services ordered by the customer, but involves a modification created by the workflow system 120, the inventory system 130, or the provisioning system 140. The product instances associated with the modified solution are matched to services components (operation 410) and divided into on-net and off-net services (operation 420). The costs of on-net services are determined (operation 430) and off-net services are estimated by correlating the off-net services (operation 435). Each off-net service component may be correlated to determine an expected cost. The correlation logic may be modified according to the current stage of the order in the order and fulfillment system 100. For example, the cost correlation may divide product instances into workflow specific product instances and into hybrid products instances that are directed towards products found in both the workflow system 120 and the order system 110. For example, a workflow specific product instance may include obtaining a permit to add network infrastructure, while a hybrid product instance may include adding a fiber optic cable. The correlation database 170 may then be searched according to the type of product instance.

Similarly, updates to the implementation made by the inventory system 130 and the provisioning system 140 may be divided into specific product instances and hybrid product instances. The correlation may be conducted and the costs aggregated to determine an updated estimate for the cost (operation 440). Thus, the projected cost of providing the services may be updated and tracked at each stage in the order process. The updated total cost may be compared to the quoted cost of the services and the results may be stored for later evaluation (operation 450). The difference between each estimated cost and the quoted cost may compared to a threshold. When the estimated cost deviates to far from the quoted cost a user may be alerted or the order and fulfillment system 100 may perform a mitigating action to bring the cost estimate within the threshold difference.

After all of the services have been provisioned, the billing system 150 determines a final bill using on-net costs and the costs charged by off-net providers. The actual amounts billed by the off-net providers may be sent to the cost correlation system 160 and used to update the correlation database 170 as historical cost data for each ECCKT. The correlation database 170 may also be updated to include the planned cost for each stage of the order process and final billed cost. If a bill for an off-net service exceeds the estimated cost by more than a threshold, then a letter or electronic communication conveying a billing dispute may be generated by the billing system 150 and sent to the off-net provider. This billing dispute may be automatically generated and sent or may require user intervention before sending. In addition to generating a billing dispute, the billing system 150 may also automatically generated dispute resolution that offers to end the dispute in exchange for a compromise billing amount. The compromise billing amount may include any amount between the planned cost and the billed cost. The compromise billing amount may selected according to a dispute policy for one or more off-net providers or service components. For example, the compromise billing amount for an off-net provider may be half way between the estimated cost and the billed cost. Thus, a billing discrepancy between the off-net provider and the customer may be automatically mitigated immediately following the receipt of a bill for off-net services without customer involvement.

Figure 5:
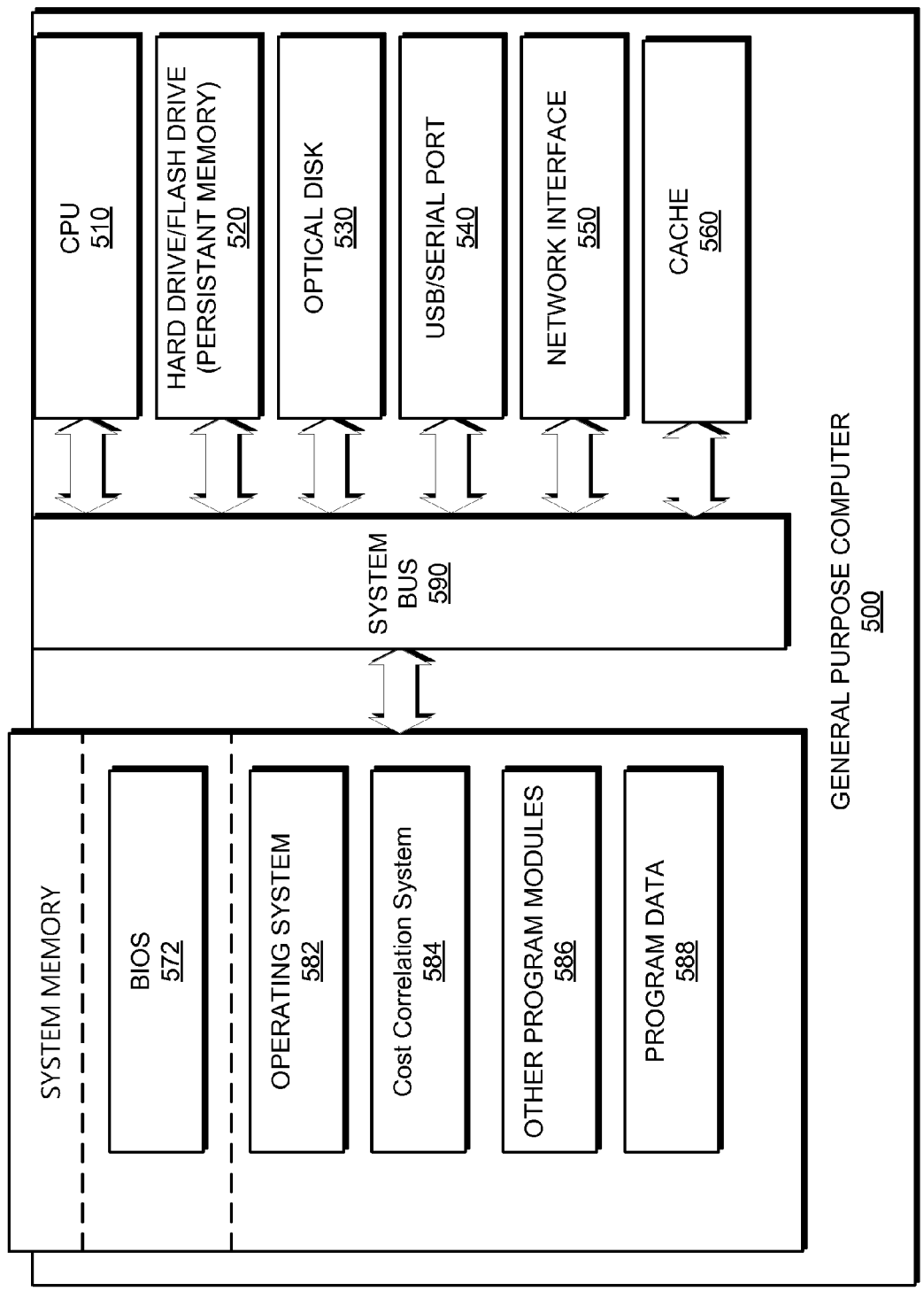
FIG. 5 depicts a general purpose computer that may be used in the implementation of the off-net cost system.

FIG. 5 illustrates an example general purpose computer 500 that may be useful in implementing the described technology. The example hardware and operating environment of FIG. 5 for implementing the described technology includes a general purpose computing device in the form of a personal computer, server, or other type of computing device. In the implementation of FIG. 5, for example, the general purpose computer 500 includes a processor 510, a cache 560, a system memory 570, 580, and a system bus 590 that operatively couples various system components including the cache 560 and the system memory 570, 580 to the processor 510. There may be only one or there may be more than one processor 510, such that the processor of the general purpose computer 500 comprises a single central processing unit (CPU), or a plurality of processing units, commonly referred to as a parallel processing environment. The general purpose computer 500 may be a conventional computer, a distributed computer, or any other type of computer; the invention is not so limited.

The system bus 590 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 570 and random access memory (RAM) 580. A basic input/output system (BIOS) 572, containing the basic routines that help to transfer information between elements within the general purpose computer 500 such as during start-up, is stored in ROM 570. The general purpose computer 500 further includes one or more hard disk drives or Flash-based drives 620 for reading from and writing to a persistent memory such as a hard disk, a flash-based drive, and an optical disk drive 630 for reading from or writing to a removable optical disk such as a CD ROM, DVD, or other optical media.

The hard disk drive 520 and optical disk drive 530 are connected to the system bus 590. The drives and their associated computer-readable media provide nonvolatile storage of computer-readable instructions, data structures, program engines and other data for the general purpose computer 500. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk 520, optical disk 530, ROM 570, or RAM 580, including an operating system 582, a cost correlation system 584 such as the one described above, one or more application programs 586, and program data 588. A user may enter commands and information into the general purpose computer 500 through input devices such as a keyboard and pointing device connected to the USB or Serial Port 540. These and other input devices are often connected to the processor 510 through the USB or serial port interface 540 that is coupled to the system bus 590, but may be connected by other interfaces, such as a parallel port. A monitor or other type of display device may also be connected to the system bus 590 via an interface, such as a video adapter 560. In addition to the monitor, computers typically include other peripheral output devices (not shown), such as speakers and printers.

The general purpose computer 500 may operate in a networked environment using logical connections to one or more remote computers. These logical connections are achieved by a network interface 550 coupled to or a part of the general purpose computer 500; the invention is not limited to a particular type of communications device. The remote computer may be another computer, a server, a router, a network PC, a client, a peer device, and typically includes many or all of the elements described above relative to the general purpose computer 500. The logical connections include a local-area network (LAN) a wide-area network (WAN), or any other network. Such networking environments are commonplace in office networks, enterprise-wide computer networks, intranets and the Internet, which are all types of networks.

The network adapter 550, which may be internal or external, is connected to the system bus 590. In a networked environment, programs depicted relative to the general purpose computer 500, or portions thereof, may be stored in the remote memory storage device. It is appreciated that the network connections shown are example and other means of and communications devices for establishing a communications link between the computers may be used.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

The invention claimed is:

1. A system for correlating costs of telecommunications services comprising:
a computing device including a processor coupled to a system memory, the system memory storing instructions for execution on the processor, the instructions configured to cause the processor to:
receive a service;
match the service to a solution, wherein the solution comprises one or more product instances;
correlate each product instance with a service component comprising an off-net component in a correlation database or an on-net component in the correlation database;
determine a planned off-net cost for each off-net component according to an external carrier circuit identifier associated with the off-net component; and
aggregate the planned off-net cost for each off-net component and a cost for each on-net component into a planned cost.

2. The system of claim 1, wherein:
the service comprises a telecommunications service;
the one or more product instances, when combined, are configured to provide the telecommunications service; and
the service component operates to provide a second service required by a product instance.

3. The system of claim 1, wherein the instructions are further configured to cause the processor to:
generate a bill for an off-net service;
compare the bill for the off-net service to the planned off-net cost; and
generate a communication conveying a billing dispute when a difference between the bill and the planned off-net cost exceeds a threshold.

4. The system of claim 3, wherein the instructions are further configured to cause the processor to generate a message conveying a dispute resolution that offers to end the billing dispute in exchange for a compromise billing amount that is less than the bill for the off-net service, but greater than the planned off-net cost.

5. The system of claim 1, wherein the instructions are further configured to cause the processor to update the planned cost according to a changed product instance provided by at least one of a workflow system, an inventory system, or a provisioning system.

6. The system of claim 1, wherein the instructions are further configured to cause the processor to:
generate at least one search criteria using a keyword in a product instance description;

search the correlation database using the at least one search criteria and determine at least one match;

generate a ranking for the at least one match according to a similarity of the match to the product instance description; and select a highest ranked match.

7. The system of claim 6, wherein the instructions are further configured to cause the processor to generate a message describing the at least one search criteria used for ranking the at least one match.

8. A non-transitory computer-readable medium storing instructions for a method of correlating costs of telecommunications services wherein the instructions comprise:

receiving a service;

matching the service to a solution, wherein the solution comprises one or more product instances;

correlating each product instance with a service component comprising an off-net component in a correlation database or an on-net component in the correlation database;

determining a planned off-net cost for each off-net component according to an external carrier circuit identifier associated with the off-net component; and aggregating the planned off-net cost for each off-net component and a cost for each on-net component into a planned cost.

9. The non-transitory computer-readable medium of claim 8, wherein:

the service comprises a telecommunications service;

the one or more product instances, when combined, are configured to provide the telecommunications service; and the service component operates to provide a second service required by a product instance.

10. The non-transitory computer-readable medium of claim 8, wherein the instructions further comprise:

generating a bill for an off-net service;

comparing the bill for the off-net service to the planned off-net cost; and generating a communication conveying a billing dispute when a difference between the bill and the planned off-net cost exceeds a threshold.

11. The non-transitory computer-readable medium of claim 10, wherein the instructions further comprise generating a message conveying a dispute resolution that offers to end the billing dispute in exchange for a compromise billing amount that is less than the bill for the off-net service, but greater than the planned off-net cost.

12. The non-transitory computer-readable medium of claim 8, wherein the instructions further comprise updating the planned cost according to a changed product instance provided by at least one of a workflow system, an inventory system, or a provisioning system.

13. The non-transitory computer-readable medium of claim 8, wherein the instructions further comprise:

generating at least one search criteria using a keyword in a product instance description;

searching the correlation database using the at least one search criteria and determine at least one match;

generating a ranking for the at least one match according to a similarity of the match to the product instance description; and selecting a highest ranked match.

14. The non-transitory computer-readable medium of claim 13, wherein the instructions further comprise generating a message describing the at least one search criteria used for ranking the at least one match.

15. A method of correlating costs of telecommunications services comprising:

receiving a service;

matching the service to a solution, wherein the solution comprises one or more product instances;

correlating each product instance with a service component comprising an off-net component in a correlation database or an on-net component in the correlation database;

determining a planned off-net cost for each off-net component according to an external carrier circuit identifier associated with the off-net component; and aggregating the planned off-net cost for each off-net component and a cost for each on-net component into a planned cost.

16. The method of claim 15, wherein:

the service comprises a telecommunications service;

the one or more product instances, when combined, are configured to provide the telecommunications service; and the service component operates to provide a second service required by a product instance.

17. The method of claim 15, further comprising:

generating a bill for an off-net service;

comparing the bill for the off-net service to the planned off-net cost; and generating a communication conveying a billing dispute when a difference between the bill and the planned off-net cost exceeds a threshold.

18. The method of claim 17, further comprising generating a message conveying a dispute resolution that offers to end the billing dispute in exchange for a compromise billing amount that is less than the bill for the off-net service, but greater than the planned off-net cost.

19. The method of claim 15, further comprising updating the planned cost according to a changed product instance provided by at least one of a workflow system, an inventory system, or a provisioning system.

20. The method of claim 15, further comprising:

generating at least one search criteria using a keyword in a product instance description;

searching the correlation database using the at least one search criteria and determine at least one match;

generating a ranking for the at least one match according to a similarity of the match to the product instance description; and selecting a highest ranked match.

21. The method of claim 20, further comprising generating a message describing the at least one search criteria used for ranking the at least one match.

* * * * *